UNITED STATES PATENT OFFICE.

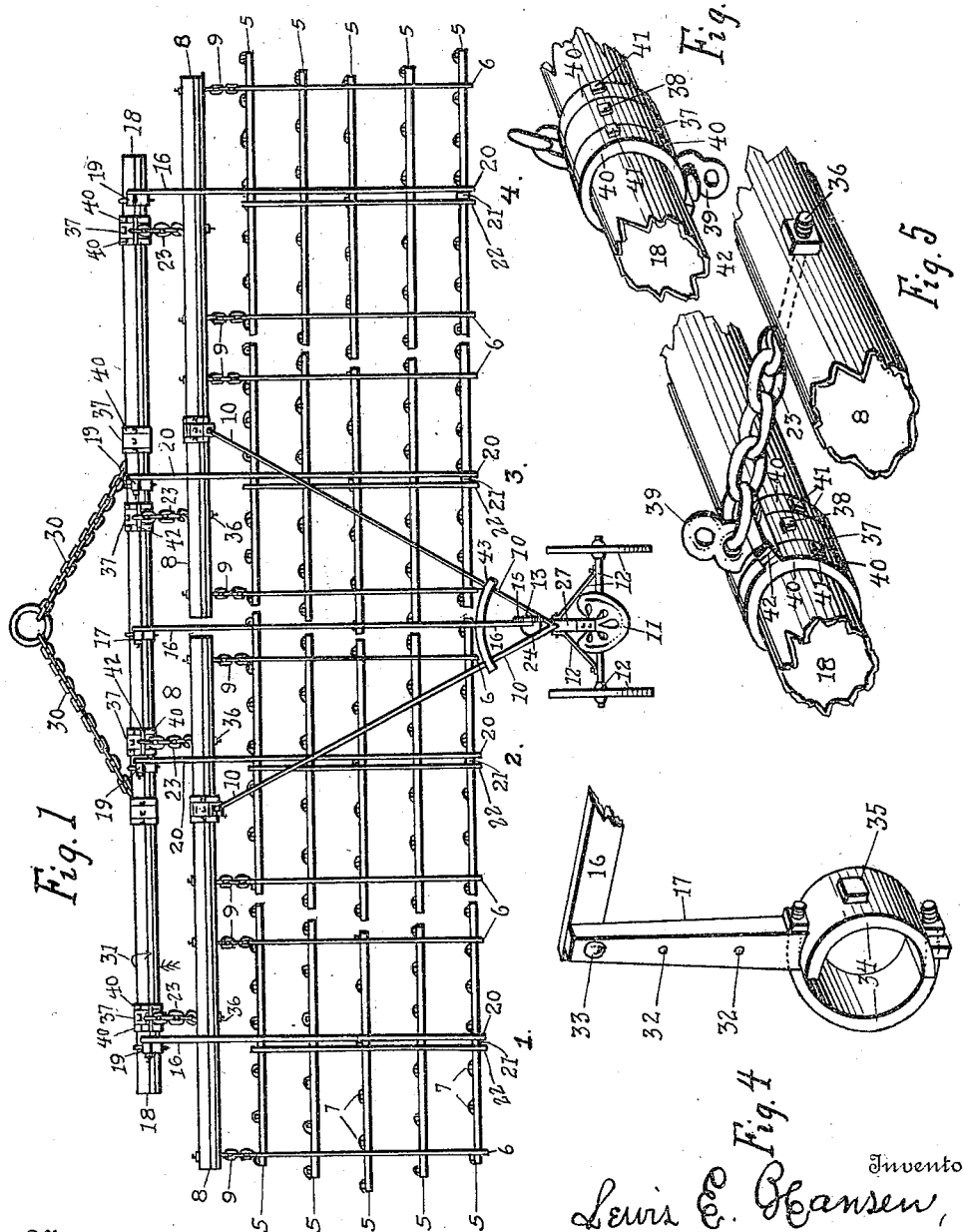

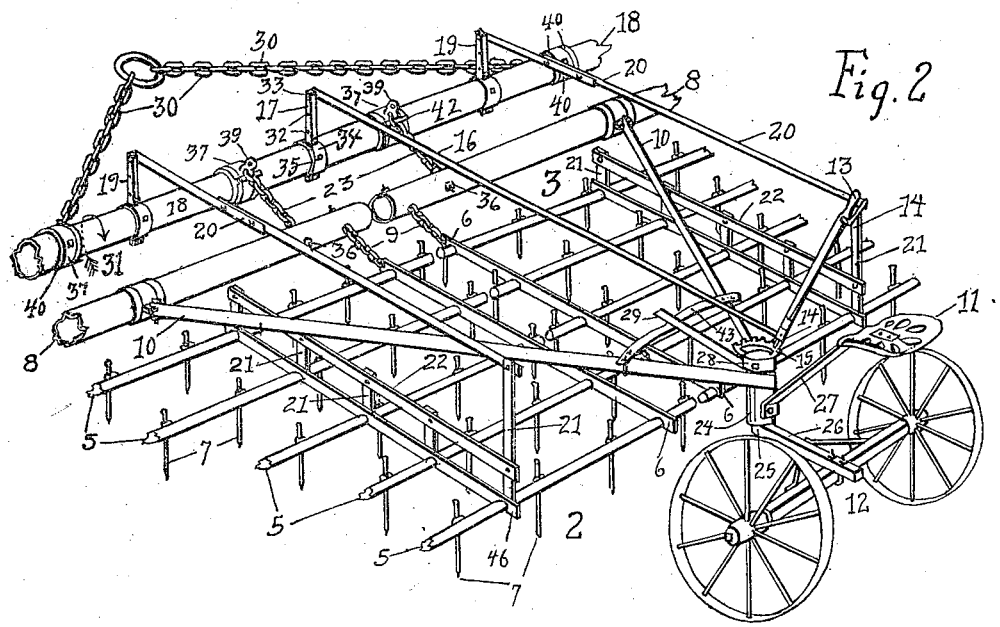

LEWIS E. HANSEN, OF BLAIR, NEBRASKA.

HARROW.

1,144,125.  Specification of Letters Patent.  Patented June 22, 1915.

Application filed August 3, 1914. Serial No. 854,613.

*To all whom it may concern:*

Be it known that I, LEWIS E. HANSEN, a citizen of the United States, residing at Blair, in Washington county, in the State of Nebraska, have invented certain new and useful Improvements in Harrows and have described the same in the following specification, illustrated by the accompanying drawings.

My invention relates to that class of sulky harrows in which the soil-stirring teeth, being normally carried in vertical positions, or in approximately vertical positions, by horizontally disposed tooth bars, the same being rockshafts, are occasionally, at the pleasure of the rider, tilted backward by the rocking of those bars, so as to slide clear of stalks, pieces of turf, and other obstructions or clogging impediments gathered or encountered by the teeth.

It is the main object of the invention to enable the driver to tilt the teeth and control the tooth-carrying rockshafts of a riding harrow of this class while occupying the sulky seat; to enable him to do this with a minimum or reduced expenditure of muscular energy; and in general to increase the efficiency of harrows of the specified class. To accomplish this object I incorporate in my improved harrow, as parts thereof, a pivoted hand lever within reach of the driver, a plurality of rock arms actuating the tooth-carrying rockshafts respectively, and an operative connection between the hand lever and the rock arms; and also communicate from the draft mechanism of the harrow to these rockshafts a torsional stress contrary in direction to that which is communicated to them by the reaction of the teeth drawn through the soil.

The accompanying drawings show the best manner in which I have contemplated applying the principles of the invention; yet the latter is not restricted to any specific arrangement or construction of parts, excepting as limitations of that kind are either expressed or necessarily implied in the subjoined claims.

In these drawings Figure 1 is a plan of a harrow which is constructed in accordance with these principles. Fig. 2 is a perspective view of a portion of the same harrow. Fig. 3 is a perspective view of a corresponding portion of the harrow in a modified form. Figs. 4, 5 and 6 are enlarged details in perspective.

That specimen of my invention which is shown in Figs. 1, 2, 4 and 5, is a riding harrow having four sections, or duplicate toothed frames, 1, 2, 3 and 4, disposed side by side in a well-known manner. Each of these sections comprises a plurality of rockshafts 5, journaled in the horizontal bars 6, and carrying a multiplicity of spaced teeth 7, which stand out in a radial or approximately radial direction from these shafts. The duplicate alining transverse bars 8, being preferably tubular, and forming part of the draft mechanism of the harrow, are connected by the draft chains 9 with the said bars 6 of the right and left pairs of said harrow sections respectively; and by the bifurcated tongue 10 are connected with and spaced from the trailing sulky 12, having the driver's seat 11. This tongue and the sulky have a pivotal or fifth-wheel connection, comprising the vertical sleeve 24, which is rigidly attached to the tongue, and the round core 25, which is an upturned portion of the sulky tongue 26, and works rotarily in the sleeve. To this sleeve is secured the leg 27 of the seat 11. On the upper end of the core 25 is fastened a retaining collar 28, and a forwardly directed radial arm 29, which has a sliding engagement with the bent detaining bar 43 spanning the arms of the tongue 10. To enable the driver to operate and control the tooth-carrying rockshafts 5, the hand-lever 13 is pivotally mounted on the sleeve 24, the latch 14 is carried by this hand-lever, the notched sector 15 is mounted on the same sleeve within reach of this latch in the various positions of adjustment of the hand-lever, this lever is connected by the pushrod 16 with the rockarm 17 on the front draft bar 18, this draft bar is provided with a rockarm 19 for each harrow section, this rockarm is connected by the pushrod 20 with one of the several rockarms 21 of the rockshafts 5, and these rockarms of each harrow section are connected to move in unison by a link 22.

The chains 30 by which the harrow is drawn, are attached to the underside of the draft bar 18, or wound thereon, in such a manner as operatively to communicate thereto a force tending to turn that bar rotarily in the direction indicated by the arrow 31. Likewise the draft chains 23 by which the bars 8 and 18 are connected in parallel positions, are attached to the upper side of the bar 18, or are partly wound thereon, in such a manner as operatively to communicate to that bar a force tending to turn the same rotarily in the same direction. On the other hand the rockarms 19 are adjustably directed upward from bar 18 in such a direction that the forward thrust of the pushrod 20, which is adjustably pivoted to that arm, normally communicates to that bar a force, derived from the rockbars 5, tending to turn the bar 18 rotarily in the opposite direction. By the described connections, made adjustable for this purpose, these opposing forces are so proportioned as normally to hold the teeth in the vertical positions shown. In this position of approximate equilibrium the teeth of each section are normally secured by the latched hand lever 13, acting through the pushrod 16, the rockarm 17, the draft bar 18, the radial arm 19, the pushrod 20, the rockshafts 5 and the radial arms 21, the latter being fastened together by the link 22 so as to move in unison. From this position the teeth are easily tilted back, clear of impediments and obstructions, as often as may be necessary, by mere manipulation of the latched hand lever.

As shown in Fig. 4, the rockarm 17 is of adjustable operative length by reason of the plurality of pinholes 32, which alternatively accommodate the pin 33 pivoting that arm to the pushrod 16. The same arm has a terminal two-part screw-clamp 34, encircling the draft bar 18 and angularly adjustable thereon by the setscrew 35. As shown in Fig. 5, which is a perspective view of one of the chains 23 and its connections, that chain is detachably connected with the draft bar 8 by the hook-bolt 36, and is adjustably connected with the draft bar 18 by the collar 37, which is provided with a setscrew 38 and with a radially projecting eyepiece 39 engaging the chain. This collar is rotarily adjustable between a pair of retaining collars 40, which are likewise provided with setscrews 41, and are integrally united by the bridge 42 against which the chain may pull.

In the modification shown in Fig. 3, the two alining draft bars 8, being movable rotarily in the collars 44 attached to the tongue 10, are respectively connected by the radial arms 17' and the pushrods 16' with the two separate levers 13, mounted on the sleeve 24 as described; are respectively connected by the radial arm 19' and the pushrods 20' with the linked radial arms 21; and are connected by the chain 23' with the draft bar 18 in such a manner as to receive therefrom a force tending to turn them rotarily in the direction indicated by the arrows 31'.

I claim as my invention—

1. A harrow of the specified class, comprising a plurality of rockshafts having teeth, a rocking draft bar having a link and lever connection with the rockshafts, and a pivoted hand lever having a like connection with the draft bar.

2. A harrow of the specified class, comprising a plurality of soil-stirring teeth, a plurality of transverse rockshafts carrying the teeth, a transverse draft bar movable rotarily, a pivoted hand lever within reach of the rider, and link and lever connections between the draft bar and the rockshafts and between the draft bar and the hand lever respectively.

3. A harrow of the specified class, comprising horizontally disposed bars, a plurality of transverse tooth-carrying rockshafts journaled in the bars, a rocking transverse draft bar, flexibly connected with the horizontal bars, a link and lever connection between the draft bar and the rockshafts, a pivoted hand lever behind the draft bar, and a link and lever connection between the draft bar and the hand lever.

4. A harrow of the specified class, comprising horizontally disposed bars, a plurality of transverse tooth-carrying rockshafts journaled in the bars, a transverse rocking draft bar flexibly connected with the horizontal bars, a link and lever connection between the draft bar and the rockshafts, a pivoted hand lever spaced from the draft bar, a link and lever connection between the hand lever and the draft bar, and a latch for holding the hand lever.

In testimony whereof I subscribe my signature hereto in the presence of two witnesses.

LEWIS E. HANSEN.

Witnesses:
 Lou. Vaughan,
 E. A. Palmer.